United States Patent [19]

Davis

[11] Patent Number: 4,548,095

[45] Date of Patent: Oct. 22, 1985

[54] BARRIER GUARD FOR SHEARS, PRESSES AND THE LIKE

[75] Inventor: Roy M. Davis, Clarence, N.Y.

[73] Assignee: Niagara Machine & Tool Works, Buffalo, N.Y.

[21] Appl. No.: 391,249

[22] Filed: Jun. 24, 1982

[51] Int. Cl.[4] ............................................. F16P 1/00
[52] U.S. Cl. ..................................... 74/612; 74/616; 192/134
[58] Field of Search ............... 74/612, 613, 615, 616, 74/103; 192/134

[56] References Cited

U.S. PATENT DOCUMENTS

| 1,105,106 | 7/1914 | Shinski | 74/616 X |
| 1,178,168 | 4/1916 | MacDonald et al. | 74/613 |
| 4,282,963 | 8/1981 | Kafura et al. | 74/612 X |

FOREIGN PATENT DOCUMENTS

| 323950 | 1/1930 | United Kingdom | 74/613 |
| 683413 | 11/1952 | United Kingdom | 74/615 |
| 787985 | 12/1957 | United Kingdom | 192/134 |

Primary Examiner—Kenneth J. Dorner
Attorney, Agent, or Firm—Joseph P. Gastel

[57] ABSTRACT

A barrier guard for a machine having a machine surface including a grille having a plurality of horizontal bars, a plurality of links having first ends pivotally mounting the grille and second ends pivotally mounted on the machine, brackets mounted on the machine, slots in the brackets, roller followers mounted on the grille and located in the slots for guiding movement of the grille in a predetermined path as it is caused to pivot relative to the links, a base bar on the grille for providing progressively greater clearances from the machine surface as the grille moves in a predetermined direction, and detents for retaining the grille in a plurality of adjusted positions.

11 Claims, 6 Drawing Figures

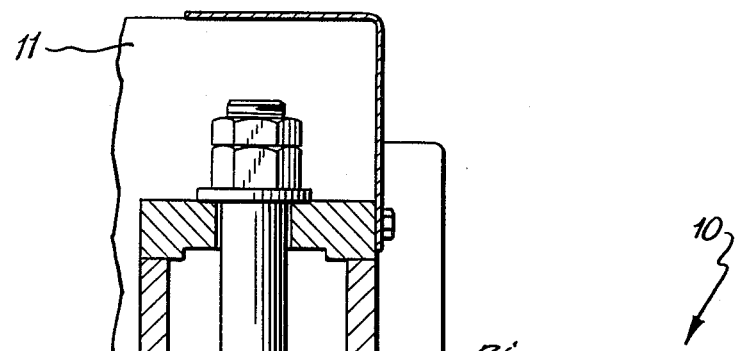
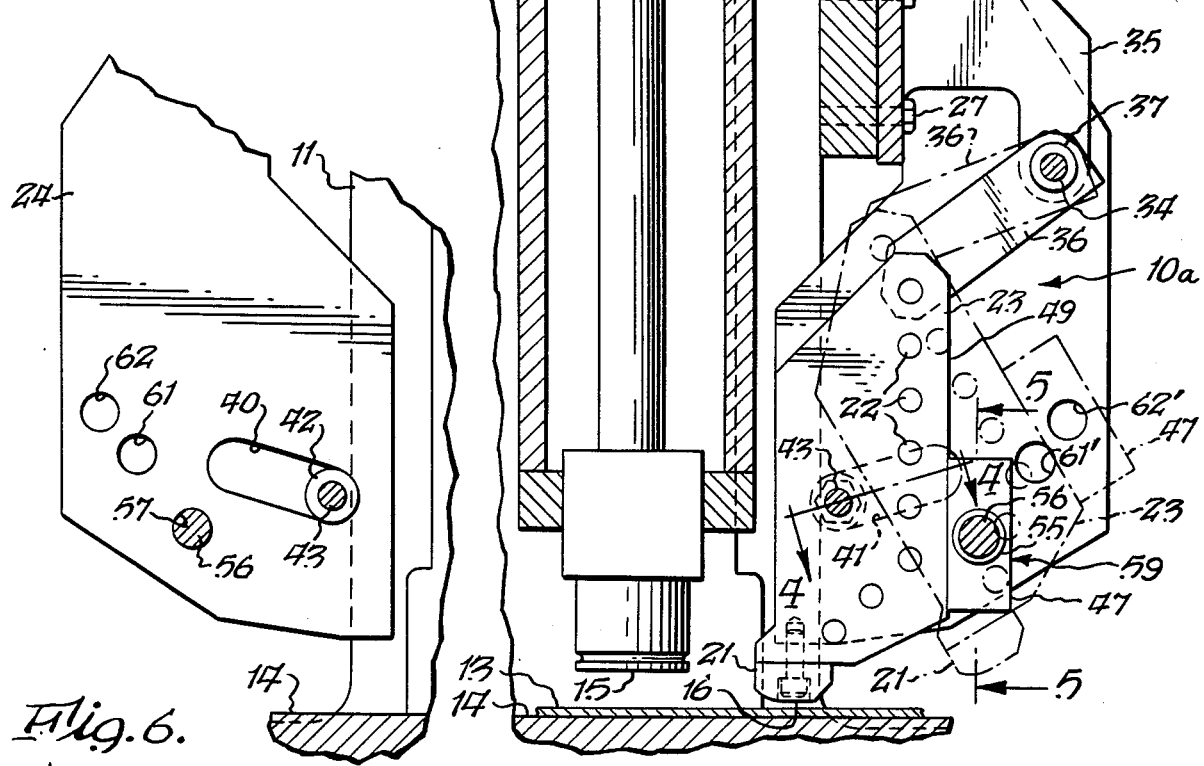
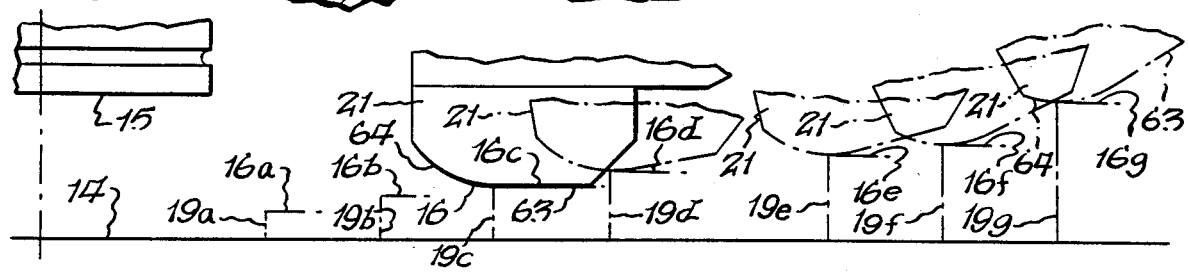

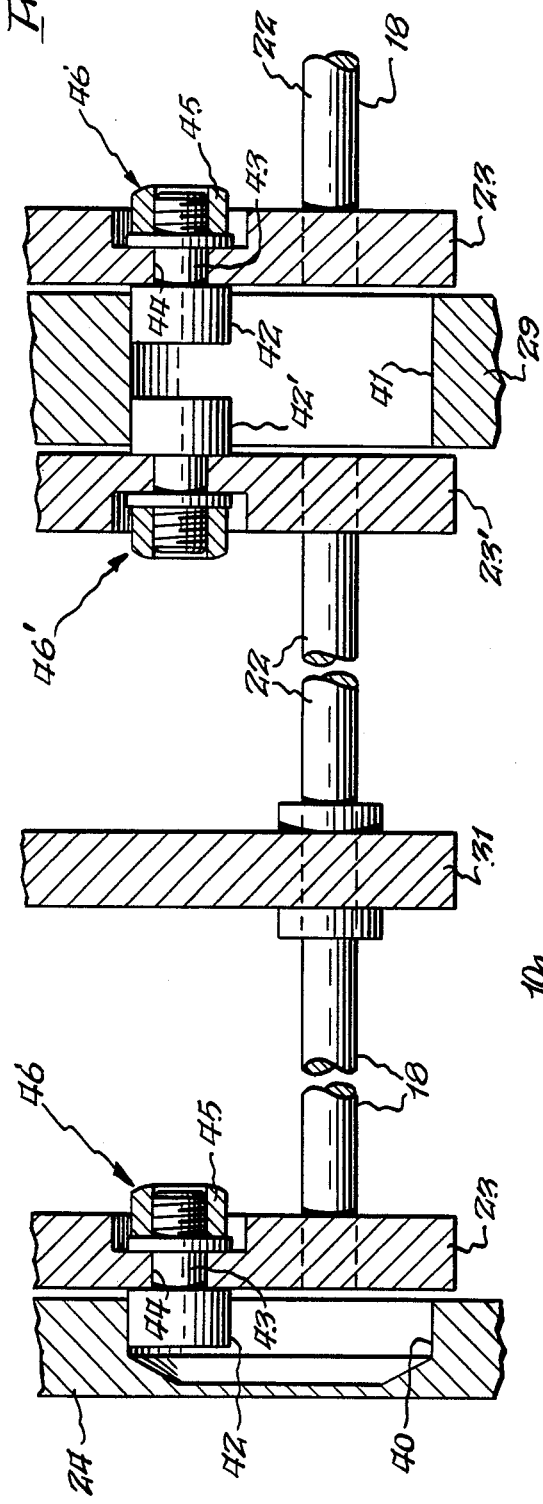
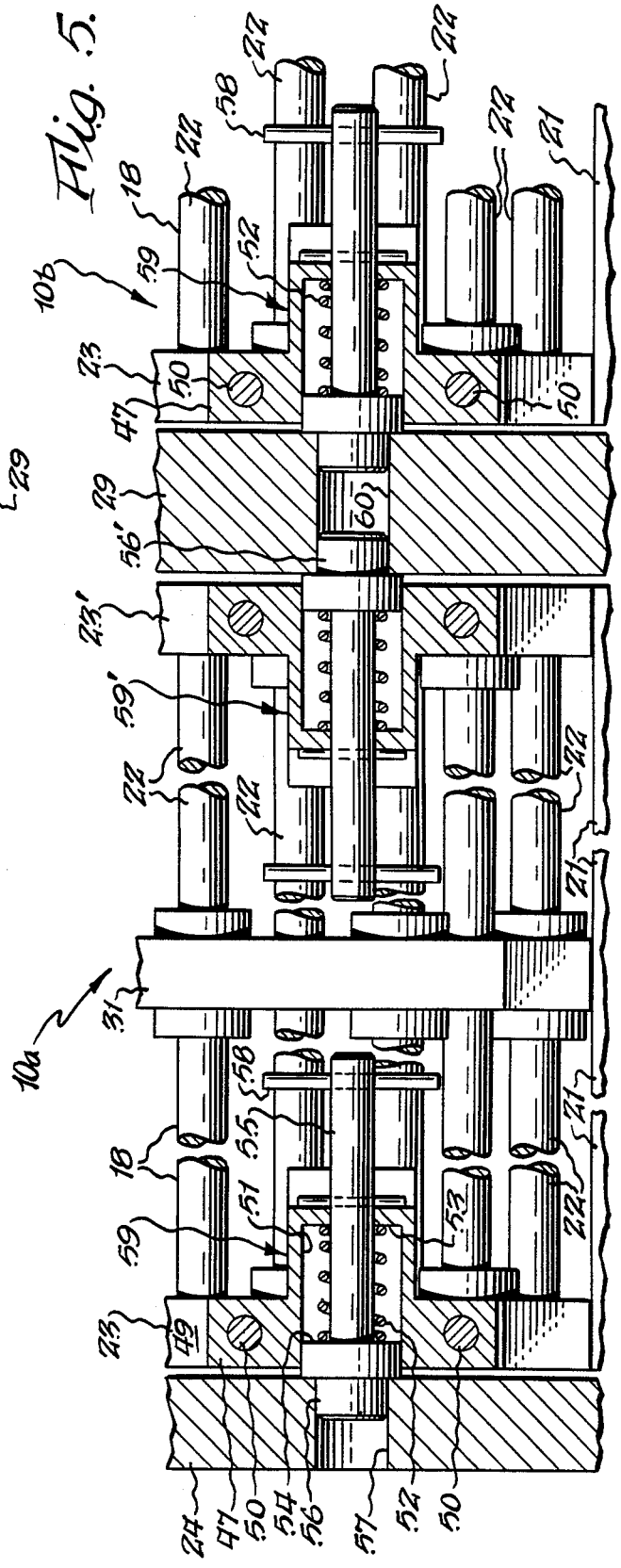

BARRIER GUARD FOR SHEARS, PRESSES AND THE LIKE

BACKGROUND OF THE INVENTION

The present invention relates to an improved barrier guard for shears, punch presses and the like.

By way of background, the lowermost portion of a barrier guard should be no further than certain distances from the bed surface of a machine at certain locations. These distances increase progressively on a compound curved path with the distance of the guard from the holddown. In the past, swinging guards were mounted to swing in a circular arc and provided greater spacings from the bed of the machine than desirable. It is with overcoming the deficiency of prior swinging guards that the present invention is concerned.

SUMMARY OF THE INVENTION

It is accordingly the object of the present invention to provide a barrier guard linkage which causes the lowermost portion of a barrier guard to always be spaced from the bed of the machine a precise desired amount. Other objects and attendant advantages of the present invention will readily be perceived hereafter.

The present invention relates to a barrier guard for a machine having a machine surface comprising barrier means, a base member on said barrier means, and means for mounting said barrier means on said machine to cause said base member to traverse a predetermined compoundly curved path to provide progressively greater clearances from said machine surface as said base member moves in a predetermined direction. The various aspects of the present invention will be more fully understood when the following portions of the specification are read in conjunction with the accompanying drawings wherein:

BRIEF DESCRIPTION OF THE DRAWINGS

FIG. 2 is a fragmentary cross sectional view taken substantially along line 2—2 of FIG. 1 and showing the improved linkage in various positions;

FIG. 3 is a fragmentary cross sectional taken substantially along line 3—3 of FIG. 1 and showing both the detent holes in the bracket and the slot-roller construction for guiding the barrier guard grilles;

FIG. 4 is an enlarged fragmentary cross sectional view taken substantially along line 4—4 of FIG. 2 and showing the slot-roller construction for guiding the grilles;

FIG. 5 is a fragmentary enlarged cross sectional view taken substantially along line 5—5 of FIG. 2 and showing the details of the detent used to hold the barrier guard grille in its various adjusted positions; and FIG. 6 is a schematic view showing the various positions of the grille base bar for providing increased clearances between it and the bed of the shear at progressively further distances from the holddown.

DESCRIPTION OF THE PREFERRED EMBODIMENTS

Figure 1:
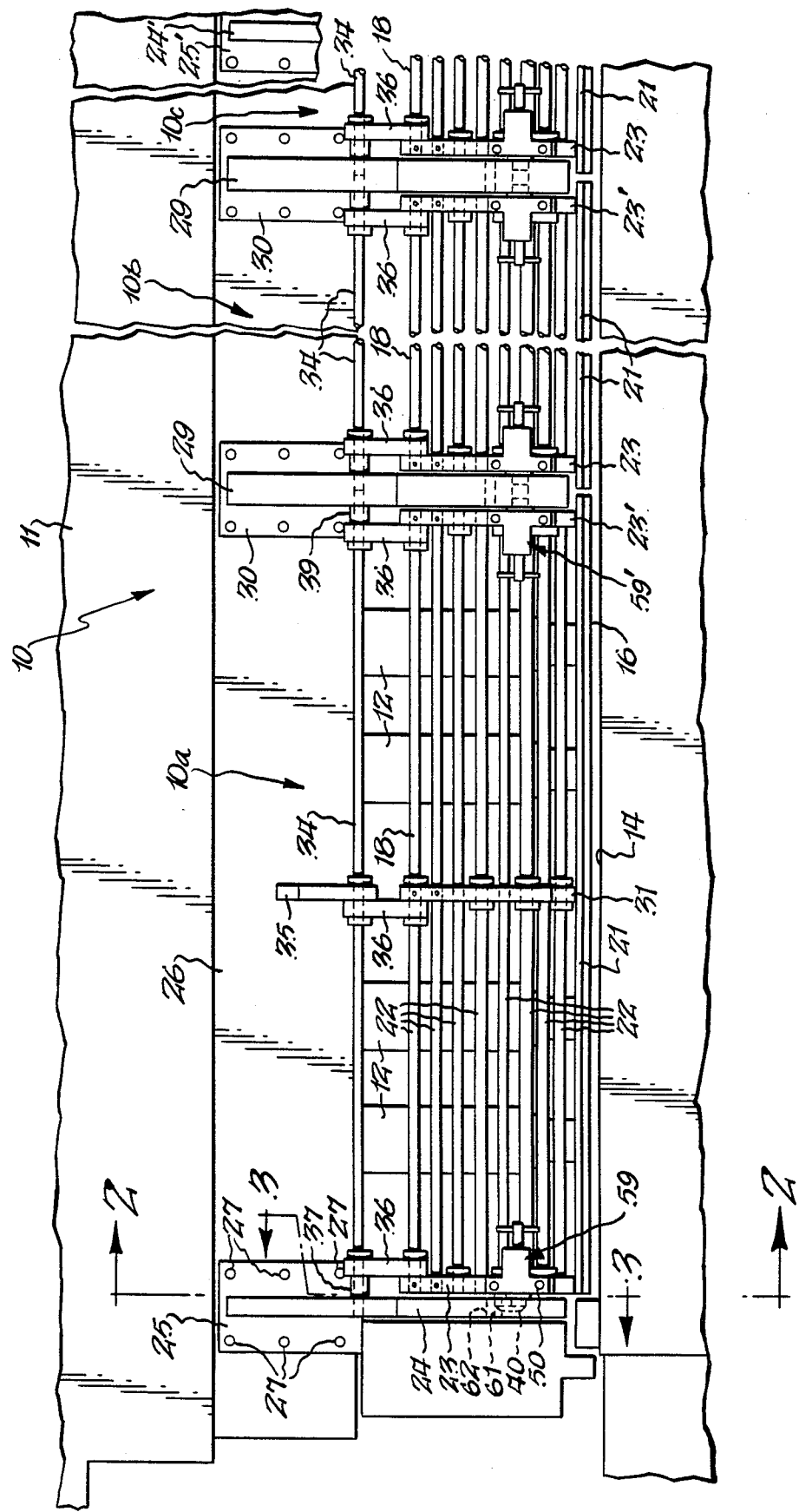
FIG. 1 is a fragmentary front elevational view of the improved barrier guard of the present invention mounted on a shear.

The improved barrier guard 10 of the present invention is shown mounted on a shear 11 having a plurality of holddown feet 12 suitably mounted thereon in the conventional manner for causing lowermost surface 15 of each holddown foot 12 to clamp a workpiece 13 onto the bed 14 of the shear.

Barrier guard 10 comprises a plurality of barrier guard sections 10a, 10b and 10c. Each barrier guard section section 10a, 10b and 10c is substantially entirely independent of adjacent barrier guard sections so that each can be adjusted independently of the others. Each barrier guard section can be of any desired length, such as 2, 3 or 4 feet. The following description will generally refer to barrier guard section 10a, and it will be appreciated that the other barrier guard sections 10b and 10c have analogous structure. In the following description, like numerals represent like parts and primed numerals represent mirror image counterparts of structure represented by like unprimed numerals.

Barrier guard section 10a includes a grille 18 having a plurality of horizontal vertically spaced rods 22 having their opposite ends secured to rod holder 23 and its mirror image counterpart rod holder 23', which are in the form of plate-like members. The spaces between rods 22 permit the shear operator to look through the grille. A base bar 21 has its opposite ends mounted on rod holders 23 and 23'.

A plate-like bracket 24 has its upper end welded to plate 25 which is secured, by means of a plurality of screws 27, to barrier guard cross bar 26 suitably mounted on the shear. Bracket 24 contributes to supporting the left end of grille 18. Bracket 29 contributes to supporting the right end of grille 18, and it is welded to a plate 30 which is secured to cross bar 26 by means of a plurality of screws (not numbered). The only difference between bracket 24 and bracket 29 is that the former supports the end of only one grille 18 whereas bracket 29 supports the ends of two adjacent grilles 18, one on each opposite side thereof. An intermediate rod holder 31, of the same shape as rod holders 23, supports the central portions of rods 20.

The grille 18 is suspended in the following manner. An upper rod 34 has its opposite ends mounted on brackets 24 and 29, and its central portion mounted on bracket 35. Links 36 have their upper ends pivotally mounted on rod 34. The two outer links 36 of barrier guard section 10a are spaced from brackets 24 and 29 by spacers 37 and 39, respectively. The lower ends of links 36 are pivotally mounted on the uppermost rod 22 of grille 18.

Roller units 46 and 46' are effectively interposed between the rod holders 23 and 23' and brackets 24 and 29, respectively, to guide grille 18 when it pivots relative to links 36. Roller unit 46 includes a roller 42 (FIG. 4) mounted on the end of shaft 43 which extends through bore 44 in rod holder 23 and is secured thereon by nut 45. Roller 42 is located in slot 40 (FIG. 4) in bracket 24. A roller unit 46', which is the mirror image counterpart of roller unit 46, is mounted on rod holder 23' and roller 42' thereof is located in slot 41 in bracket 29.

A compound movement is produced by suspending grille 18 by links 36 and guiding its movement by the slot-roller connections to cause the lowermost portion of base bar 21 to assume the various positions shown in FIG. 6. The positions are shown in FIG. 6. If the base bar 21 of grille 18 is located at line 19a, the lowermost surface 16 of base bar 21 is at a height shown at 16a. If the base bar 21 is at the line 19b, the lowermost surface 16 of the base bar 21 will be at a height 16b. *When the base bar 21 is at lines 19c, 19d, 19e, 19f and 19g, the* lowermost surface 16 of the base bar 21 will be at heights shown at 16c, 16d, 16e, 16f and 16g, respectively. The foregoing positions 16, 16a, 16b and 16c through 16g lie on an irregular curve.

Detent constructions 59 and 59' are provided to hold grille 18 in its various positions. Detent construction 59 includes a housing 47 which is secured to the end 49 of rod holder 23 by means of a pair of screws 50. A chamber 51 is provided in housing 47 and a spring 52 is positioned between wall 53 of housing 47 and shoulder 54 of plunger 55. One end of plunger 55 is formed into a cylindrical detent 56 which is received in bore 57 in bracket 24 (FIGS. 3 and 5), and the other end mounts handle 58. Detent constructions 59' mounted on rod holder 23' is the mirror image counterpart of detent construction 59 and it includes a detent member 56' which is received in bore 60 (FIG. 5) in bracket 29. Thus, in the solid line position of rod holder 23 in FIG. 2 detent members 56 and 56' are biased into bores 57 and 60, respectively, to retain the grille 18 in the solid line position. In this position, base bar 21 is located in the position corresponding to 16c and 19c of FIG. 6.

As can be seen from FIG. 3, bracket 24 also includes bores 61 and 62. When detent members 56 and 56' are removed from bores 57 and 60, respectively, and member 56 is inserted into bore 61 and member 56' is inserted into a counterpart bore 61' in bracket 29, base bar 21 will assume a position corresponding to 16e and 19e shown in FIG. 6. When detent 56 is inserted into bore 62 and detent 56' is inserted into a counterpart bore 62' in bracket 29, base bar 21 will assume the position corresponding to 16g and 19g in FIG. 6. While only three positions are shown for grille 18, it will be appreciated that additional bores analogous to 57, 61 and 62 may be provided to cause base bar 21 to assume all of the positions shown in FIG. 6.

The curvature of surface 16 of base bar 21 is instrumental in determining the clearance from bed 14. As can be seen from FIG. 6, lower surface 16 of base bar 21 includes a straight portion 63 and a curved portion 64. In the position at 19c, it is the straight surface 63 which determines the clearance to bed 14, and in the positions at 19e, 19f and 19g, it is the curved surface 63 which determines the clearance to bed 14.

Barrier guide section 10b is mounted in the same manner as barrier guide section 10a except that it extends between two double brackets 29. Since all of the structure of grille 18 of barrier guard section 10b is identical to that of barrier guard section 10a, it is deemed that an additional specific description is not necessary.

Barrier guide section 10c including its mounting structure may be the mirror image of barrier guide section 10a and therefore it is deemed that a detailed description is not necessary. It will be further appreciated that there may be as many barrier guide sections 10b as is necessary, depending on the length of the shear.

As expressed above, each of the barrier guide sections 10a, 10b and 10c can be adjusted independently of the others so that a number of different thicknesses of material may be sheared by different operators standing at different points along the shear, or a workpiece having different thicknesses may be sheared because the barrier guide sections 10a, 10b and 10c can be adjusted to different heights.

It will be appreciated that by changing the length of links 36 and the location and/or curvature of slots 40 and 41, the path followed by the lowermost portion of base bar 21 may also be changed, and thus the path followed by base bar 21 need not always be an irregular curve.

While preferred embodiments of the present invention have been disclosed, it will be appreciated that the present invention is not limited thereto but may be otherwise embodied within the scope of the following claims.

What is claimed is:

1. In a machine having a frame and a machine surface leading to an area where a movable portion of the machine engages a workpiece, a barrier guard comprising elongated barrier means, a plurality of link means spaced lengthwise of said elongated barrier means, first and second ends on said link means, first pivotal connections effectively located between said first ends of said link means and said frame of said machine, second pivotal connections effectively located between said second ends of said link means and said barrier means, bracket means, means fixedly mounting said bracket means on said frame of said machine, coacting slot means and follower means between said bracket means and said barrier means and operative in combination with the pivotal action of both said first and second pivotal connections of said link means during operation of said coacting slot means and follower means for guiding the path of said barrier means, and base means on said barrier means for providing progressively greater clearances from said machine surface during relative movement between said barrier means and said bracket means as said base means moves away from said area where said movable portion of said machine engages said workpiece, said slot means comprising a slot located in said bracket means, and said follower means comprising a roller mounted on said barrier means.

2. In a machine as set forth in claim 1 including detent means for holding said barrier means in a plurality of different positions.

3. In a machine as set forth in claim 1 wherein said base means includes a surface of compound configuration with various portions of said surface providing said clearances from said machine surface in different positions of said base means.

4. In a machine set forth in claim 3 wherein said base means comprises a base bar.

5. In a machine as set forth in claim 3 including detent means for holding said barrier means in a plurality of different positions.

6. In a machine as set forth in claim 1 wherein said barrier means comprises a grille.

7. In a machine as set forth in claim 6 wherein said grille includes a plurality of rods, and holder means for mounting said rods.

8. In a machine as set forth in claim 7 wherein said rods comprise a plurality of vertically spaced horizontal rods, and wherein said holder means comprise spaced plate-like members.

9. In a machine as set forth in claim 1 wherein said base means comprises a base bar.

10. In a machine having a frame and a machine surface leading to an area where a movable portion of the machine engages a workpiece, a barrier guard comprising elongated barrier means, a plurality of link means spaced lengthwise of said elongated barrier means, first and second ends on said link means, first pivotal connections effectively located between said first ends of said link means and said frame of said machine, second pivotal connections effectively located between said second ends of said link means and said barrier means, bracket means, means mounting said bracket means on said frame of said machine, follower means coupling said bracket means and said barrier means and operative in combination with said link means for guiding the path of said barrier means, and base means on said barrier means for providing progressively greater clearances from said machine surface during relative movement between said barrier means and said bracket means as said base means moves away from said area where said movable portion of said machine engages said workpiece, said barrier means comprising a grille, said grille including a plurality of rods, and holder means for mounting said rods, and said follower means comprising slots and follower members between said holder means and said bracket means.

11. In a machine as set forth in claim 10 including detent means for holding said grille in a plurality of different positions.

* * * * *